United States Patent [19]

Ueda et al.

[11] 3,961,161

[45] June 1, 1976

[54] SYSTEM FOR PREPARING COMMUTATION TICKET AND THE LIKE

[75] Inventors: Hiroyuki Ueda; Yukio Sawano, both of Asaka, Japan

[73] Assignee: Fuji Photo Film Co., Ltd., Minami-ashigara, Japan

[22] Filed: Apr. 24, 1974

[21] Appl. No.: 463,720

[30] Foreign Application Priority Data
Apr. 24, 1973  Japan.................................. 48-46401

[52] U.S. Cl.................... 235/61.11 F; 235/61.7 B; 235/61.9 R; 40/35; 354/105
[51] Int. Cl.².................... G06K 1/14; G06K 7/10; G03G 16/00; G09F 11/06
[58] Field of Search................ 235/61.11 E, 61.7 B, 235/61.9R; 95/1.1; 40/35, 53, 2.2; 250/568, 569, 570; 340/173 LT, 173 MA; 88/24

[56] References Cited
UNITED STATES PATENTS

| | | | |
|---|---|---|---|
| 2,124,906 | 7/1938 | Bryce | 40/53 |
| 2,975,282 | 3/1961 | Schaffer | 235/61.11 E |
| 3,212,395 | 10/1965 | Bailey | 40/35 |
| 3,216,317 | 11/1965 | Nail | 88/24 |
| 3,375,500 | 3/1968 | Fowler | 235/61.7 B |
| 3,376,661 | 4/1968 | Hulett | 40/2.2 |
| 3,631,773 | 1/1972 | Moodie | 95/1.1 |
| 3,679,875 | 7/1972 | Rawson | 235/61.7 B |
| 3,728,522 | 4/1973 | Norwich | 235/61.7 B |
| 3,775,594 | 11/1973 | Pasieka | 235/61.11 E |
| 3,822,375 | 7/1974 | Ozeki | 235/61.9 R |

*Primary Examiner*—Daryl W. Cook
*Assistant Examiner*—Robert M. Kilgore
*Attorney, Agent, or Firm*—Sughrue, Rothwell, Mion, Zinn & Macpeak

[57] ABSTRACT

In a system for preparing a commutation ticket and the like, letter and figure patterns generated in a ultramicrofiche and a display panel and the name and age of a commuter are optically transcribed on a photosensitive card, all the data required for the preparation of the commutation ticket and the like are further recorded as digital marks on a part of the photosensitive card, and means for reading out the digital marks recorded on a previously issued commutation ticket and the like are provided for preparing a new commutation ticket and the like.

4 Claims, 4 Drawing Figures

SYSTEM FOR PREPARING COMMUTATION TICKET AND THE LIKE

BACKGROUND OF THE INVENTION

1. Field of the Invention

This invention generally relates to automatic systems for preparing commutation tickets and the like, and, more particularly, to a type thereof whereby continued issue and automatic examination of the commutation tickets and the like can be far more facilitated than in the conventional systems.

2. Description of the Prior Art

Heretofore, a commutation ticket has been prepared in a booking office by a person who, examining a request card prepared by a passenger, prints with rubber stamps or writes by hand on a ticket card the required data such as the starting station, the destination station, the route to be utilized, the period of validity and the issue date of the ticket, as well as the kind (for school attendance or office attendance) of the ticket, the name and age of the commuter, the fare, and so forth, based on the contents of the request card. However, while such a procedure is found to require considerable labor and time, the background job thereof such as the stock control of the ticket cards and the accounting of money and the tickets thus issued also consumes much time and labor.

Recently, plans for reduction of the labor required in and for the speeding up of booking jobs have been promoted in various fields of transportation such that not only is the time required for the booking jobs reduced, but also the service for the passengers is much improved. Along such efforts, various types of automated devices have been proposed for the preparation and issue of commutation tickets. However, even the most automated device for this purpose has been found to involve various difficulties as listed hereinbelow.

The preparation of the commutation tickets in most of the conventional devices for preparing commutation tickets has required the following steps.

1. A passenger who wants a commutation ticket is required to provide a request card containing the necessary data such as the starting station, the destination station, and so forth.
2. A person in a booking office examines the contents of the request card, and inputs the required information into the commutation ticket preparing device by either depressing keys on a key board, or by transcribing the information onto a mark card from which the data can be automatically read out by a card reader and input into the ticket preparing device.
3. The ticket preparing device automatically searches over data which does not vary, such as the starting station, the destination station, the route utilized, the kind of the ticket, and the period of validity thereof, which have been previously stored in the device in an electronic manner or a photographic manner thereby to find those data corresponding to the input information. The data thus found are then imprinted using an optical method or an electrostatic recording method at predetermined positions on a ticket card sequentially or simultaneously. During the above described procedures, a fare searching signal formed in accordance with these data is input to a minicomputer included in the system or to a computer in a central booking office through a data transmission line thereby to calculate the fare. The fare thus calculated is then converted into a decimal notation and printed on a predetermined position of the ticket card together with other data which varies such as the serial number of the ticket, the issue date, and the like.
4. For preparing a commutation ticket adapted to be examined automatically, the ticket card after step (3) is further transferred manually or automatically into a device termed a "seal encoder". This device may be included within the system or provided separately outside of the system. When a ticket card is passed through the seal encoder, a transparent plastic film is bonded on the front face of the card, and a magnetic film is bonded on the rear face thereof in a manner in which the entire peripheral edges of the card are thereby sealed together. After completion of the sealing operation, the data required for automatic examination are recorded by the magnetic encoder on the magnetic film on the rear side of the card, so that the ticket card is now provided with a front face readable visually and the rear face readable by a machine such as an automatic ticket reader.

However, it is essential for an automatic ticket preparing system that the ticket be prepared in the shortest period of time, and the conventional system employing the seal encoder cannot meet this requirement since it consumes about twice the length of time required for preparing an ordinary commutation ticket which cannot be automatically electronically examined.

Furthermore, all of the required data must be retained until the thus sealed ticket card arrives at the magnetic recorder position, and this requires a registor which can temporarily store about 200 bits and also an electronic device for controlling the shift of the thus memorized data.

In addition, a greater part of the commutation tickets are issued for school or office commuting, and hence the tickets are of a continuing nature with only the issue date and the period of validity being changed and all of the remaining data being unchanged. No conventional commutation ticket preparing devices have ever utilized this feature, and the above described steps (1) through (3) are repeated with all the data being reintroduced either using a keyboard or by transcribing the data onto a mark card.

SUMMARY OF THE INVENTION

A primary object of the present invention is to provide an improved commutation ticket preparing system wherein the required time for preparing the ticket is substantially reduced.

Another object of the present invention is to provide an improved commutation ticket preparing system, the construction of which is comparatively simple.

Still another object of the present invention is to provide an improved commutation ticket preparing system wherein optical marks are provided instead of magnetic records for the automatic examination of the commutation ticket.

Still another object of the invention is to provide an improved commutation ticket preparing system wherein the optical marks are imprinted on the ticket card at the same time the required data readable visually are printed optically on the front face of the ticket card.

An additional object of the present invention is to provide an improved commutation ticket preparing system wherein the reissued commutation tickets can be prepared utilizing old tickets, respectively.

The above described objects and other advantageous features of the present invention can be achieved by an improved system of the invention for preparing commutation tickets and the like. The system of the invention comprises means for generating letter and figure patterns required for providing a commutation ticket and the like, and optically recording the same on a photosensitive material, means for optically recording the data required for the preparation of the commutation ticket on the photosensitive material as digital marks readable by machine, and means for reading the digital marks recorded on a previously issued commutation ticket and the like for utilizing the optically recorded data in the preparation of the new ticket.

The nature, principle, and utility of the present invention will be more fully understood from the following detailed description of the invention with respect to a preferred embodiment thereof when read in conjunction with the attached drawings.

BRIEF DESCRIPTION OF THE ACCOMPANYING DRAWINGS

DETAILED DESCRIPTION OF THE INVENTION

Figure 1:
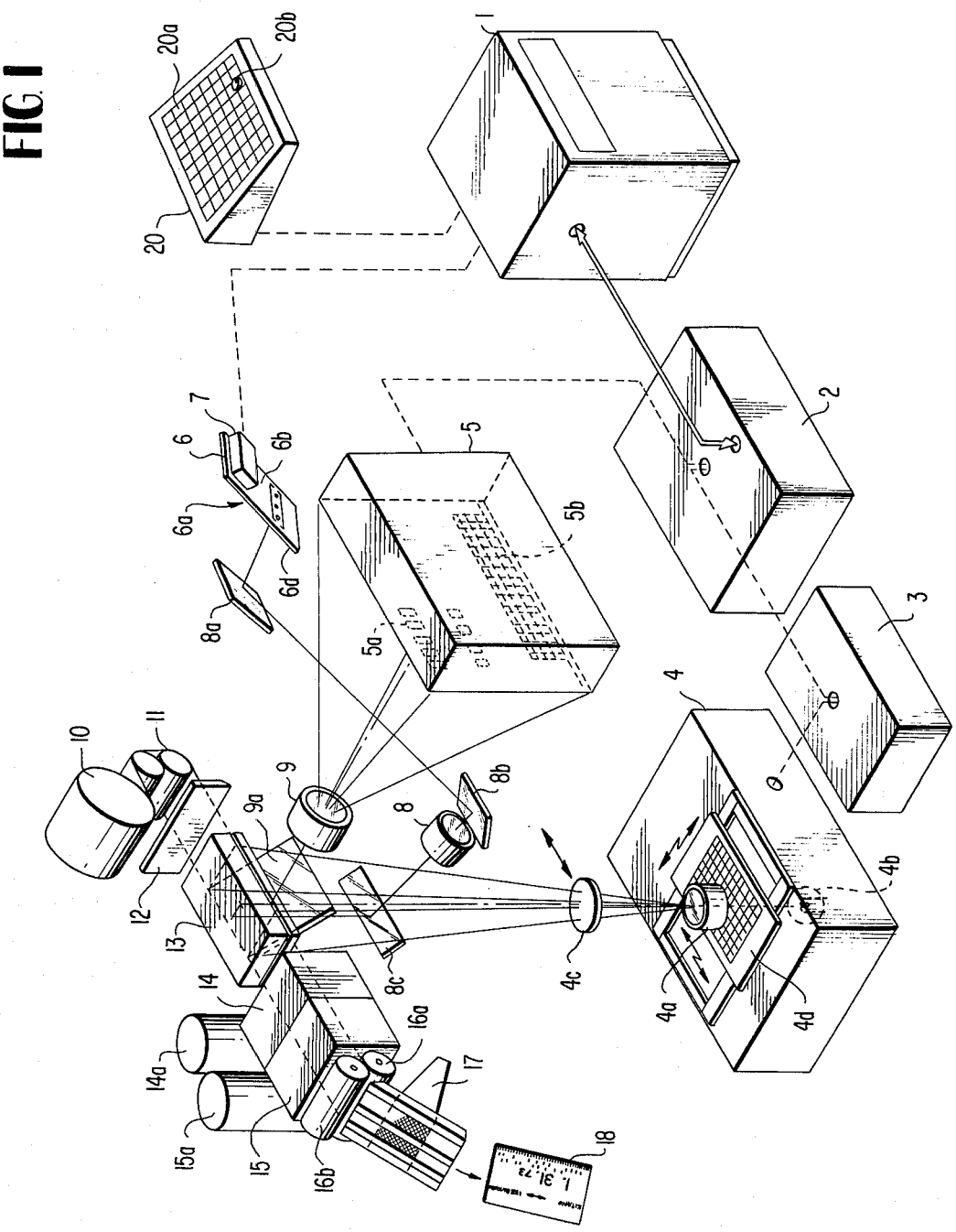
FIG. 1 is a perspective view schematically showing an example of the system for preparing commutation tickets and the like in accordance with the present invention.

Referring now to FIG. 1 showing the system for preparing commutation tickets and the like in accordance with the present invention, there is indicated a request card 6, on the front surface 6a of which there are filled with data such as the name, address, age, and sex of the commuter, the name and address of the school or office to which the commuter is commuting, railway line information (inclusive of a starting station, destination station, and route designation), the starting date of usage and the period of validity, the kind of the commutation ticket (such as for commuting to school or an office), and so forth, all required for the preparation of a commutation ticket.

On the rear side 6b of the request card 6, a frame in which optical marks are to be printed is provided, so that the card 6 can also be used as an optical mark card.

The inputs for the system are introduced through a key board 20 or through the optical mark card as described above. Where the inputs are introduced through the key board 20, a person who examines the request card 6 depresses the keys on the key board 20 corresponding to the data such as the starting station, the destination station, and the route designation. Furthermore, when the request card 6 is inserted into an input device (not shown), the card 6 is shifted to a position where the name, age, and sex of the commuter written on the leading end portion 6d of the request card 6 can be read out optically. Thus, by depressing a start button 20b on the key board 20, the part of the data introduced through the keyboard are input to a minicomputer 1, and the remainder of the data such as the name of the commuter which cannot be introduced through the keyboard are introduced optically from the request card 6.

Where all the data is introduced directly from the request card 6, a person in the booking office first prints optical marks in the frame provided on the rear side thereof based on the data appearing on the front surface 6a. The request card 6 thus imprinted with the optical marks is then inserted into the input device (not shown). A mark reader 7 provided in the input device reads the optical marks representing those data previously introduced through the keyboard and passes these data to the minicomputer 1. When the card 6 is stopped at a position as described hereinbefore, the remainder of the information such as the name of the commuter which cannot be represented by optical marks is read out optically from the front surface 6a of the request card 6, and is introduced into the system when the push button 20b is depressed as described before. The minicomputer 1 is electrically connected through an interface 2 to a servoamplifier 3 and a mechanism 4 both provided for shifting a ultramicrofiche 4d, and also to a display panel 5.

Figure 2:
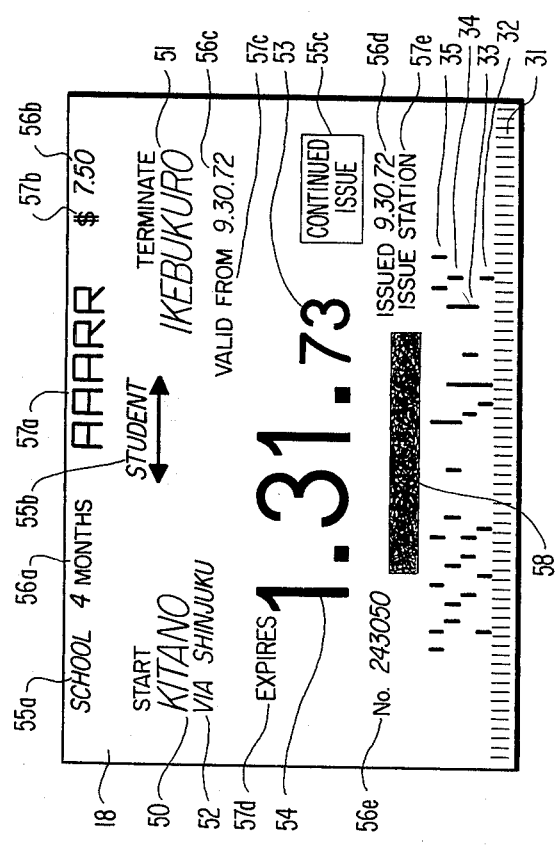
FIG. 2 is a plan view showing an example of a commutation ticket prepared by the system according to this invention.

All the data related to the names of the starting station 50, destination station 51, information 52 for designating the route as appearing in a commutation ticket shown in FIG. 2, which are in charge of a booking office and hence are not varied over a very wide range, and also to the year and month 53, day 54, and the kind of the ticket 55b also appearing in FIG. 2 are stored in respective frames of the ultramicrofiche 4d which includes up to 1024 frames.

Each input for the minicomputer 1 is converted therein into coordinate signals for selecting a frame of the ultramicrofiche 4d corresponding to the input, and a pair of X–Y coordinate analog voltages obtained in the interface 2 are applied to the servo-amplifier 3. In the X–Y coordinates shifting mechanism 4, servomotor driving systems for the X–Y coordinates are included, whereby the ultramicrofiche 4d is moved in accordance with the co-ordinate voltages from the servo-amplifier 3.

The ultramicrofiche 4d includes up to 1024 frames which are allocated in such a manner that each frame includes an image of a name of a station such as a starting station, a destination station, and a route designation to be printed in a commutation ticket to be prepared by a booking office, or an image of a combination of a year selected from three choices of years and a month selected from one of the twelve months, or that of a day selected from 31 days of a month, the latter two images being used for indicating the termination date of the period of validity of the commutation ticket.

Additional frames within the 1024 frames are allocated to indicate the kind of the commutation ticket such as for school attendance or for office workers.

The ultramicrofiche 4d as described above is moved under the control of the X–Y co-ordinate voltages in a lateral direction in the optical axis of a magnifying lens 4a, so that the image of a frame coming under the optical axis is projected in a magnified manner on a photosensitive card placed in an exposing device 13 at a position of the card in accordance with the image in the frame. Since the light source 4b is continuously activated, a shutter 4c is provided for blocking the light during the movement of the ultramicrofiche 4d and for permitting light to pass therethrough when a required frame of the ultramicrofiche is brought into the optical axis of the magnifying lens 4a.

All of the variable data such as FIG. 56a indicating the period of validity, a FIG. 56b indicating the fare, a FIG. 56c indicating the starting date of the period of validity, figure 56d indicating the issue date, and a FIG. 56e indicating the ticket preparing machine, which are indicated by smaller size figures as shown in FIG. 2, are displayed on a display panel 5 at their required positions under the control of the minicomputer 1 by means of, for instance, numeric displaying tubes 5a.

On the other hand, all of the fixed data such as "months" appearing after the FIG. 56a, "No." preceding the figure 56e, a notation 57a indicating the railway line, etc. are provided by letter plates detachably fixed at required positions on the display panel 5 and by diffusing light (not shown) applied from the rear side of the letter plates.

The above described example of the commutation ticket as shown in FIG. 2 is further provided with an optically recorded bit pattern at a lower part thereof, which constitutes an important part of the present invention. By the use of the bit pattern, automatic examination of the commutation ticket is made possible. Furthermore, when a continued commutation ticket is to be prepared, the old commutation ticket having the bit pattern can be introduced into the input device having a mark reader 7 in place of the request card 6 so that most of the required data can be read out through the mark reader 7.

The bit pattern is recorded optically in the lower part of the commutation ticket by means of about 200 light emitting elements arranged in the lower part of the display-panel 5 in five lines and activated by signals issued from the interface 2 under the control of the minicomputer 1. The construction and operation of this part of the system will be described hereinlater in greater detail.

As described above, three kinds of data consisting of variable data such as figures indicating the period of validity, fare, and the like, fixed data such as the months and No., and the bit pattern, are provided on the display-panel 5, and these data are projected through a lens 9 on the photosensitive card in the exposing device 13 with the size of the images being made smaller. Furthermore, the name, age, and sex of the commuter hand-written on the request card 6 are projected through mirrors 8a, 8b, and 8c and a lens 8 onto the photosensitive card at a position 58 (FIG. 2) with the size of the images being somewhat reduced.

From the above descriptions, it will now be clearly understood that the data from the ultramicrofiche 4d, display-panel 5, and the request card 6 are all projected on the photosensitive card with the sizes of the letters or figures being appropriately enlarged or reduced, and are printed in a synthesized manner on the card. During this time, the data in the ultramicrofiche 4d are subjected to six consecutive exposures after the reception of the starting signal, and the transcriptions of data on the display-panel 5 and the request card 6 are carried out within this period.

The photosensitive card is prepared by cutting photosensitive paper fed through a pair of feed rollers 11 from a photosensitive paper roll 10, by a guillotine cutter 12 into a predetermined size. The card thus prepared is then inserted into the exposing device 13 with the photosensitive surface directed toward the optical systems.

When the exposures through the three optical systems are completed, a signal is issued so that the photosensitive card is sent to a developing device 14 and a stabilizing device 15. When a completion signal is received, the feed rollers 11 are again rotated thereby to prepare another photosensitive card which is inserted into the exposing device 13. Numeral 14a designates a developing liquid tank, and numeral 15a designates a stabilizing liquid tank. Passing through the devices 14 and 15, images on the photosensitive card are stabilized in a short time through a silver stabilized photographic process. The photosensitive card passed through the devices 14 and 15 and still in a wet state is then passed through heat rollers 16a and 16b and a blower 17 for drying completely, and then carried by a conveyor belt (not shown) and delivered from the front panel of this system.

The commutation tickets each including the required data as shown in FIG. 2 are automatically prepared by repeating the above described procedures. Several seconds after the depression of the start button are required for preparing one commutation ticket.

The formation of the optical mark pattern constituting an important part of the present invention will now be described with reference to FIG. 3.

The format of the optical mark pattern is recorded in the lower part of a commutation ticket, as shown in FIG. 2, in five lines. As viewed from the bottom upward, the lowermost line 31 represents a series of timing pulses, while the subsequent lines 32, 33, 34, and 35 constitute data tracks. The timing pulses recorded simultaneously with the recording of the data tracks are used for obtaining a correct timing and also for counting when the data tracks are read out. The data tracks are so composed that the vertically aligned positions or meshes of these tracks, when read out by the mark reader 7 disposed vertically to these tracks, constitute a pure binary four bit code.

In other words, the existence of a black mark in the vertically aligned positions in the lines 32, 33, 34, and 35 correspond respectively to 1, 2, 4, and 8 in decimal notation. Herein, a while mark (or void) corresponds to a binary 0 and a black mark corresponds to a binary 1. Furthermore, when the black mark is optically recorded in a position of mesh belonging to these lines, it is recorded in such a manner that about 50% of the mesh area is blackened while about 25% of white space is left on each side of the blackened portion. Examples of such black marks are indicated in a left part of the timing pulse track 31.

Figure 3:
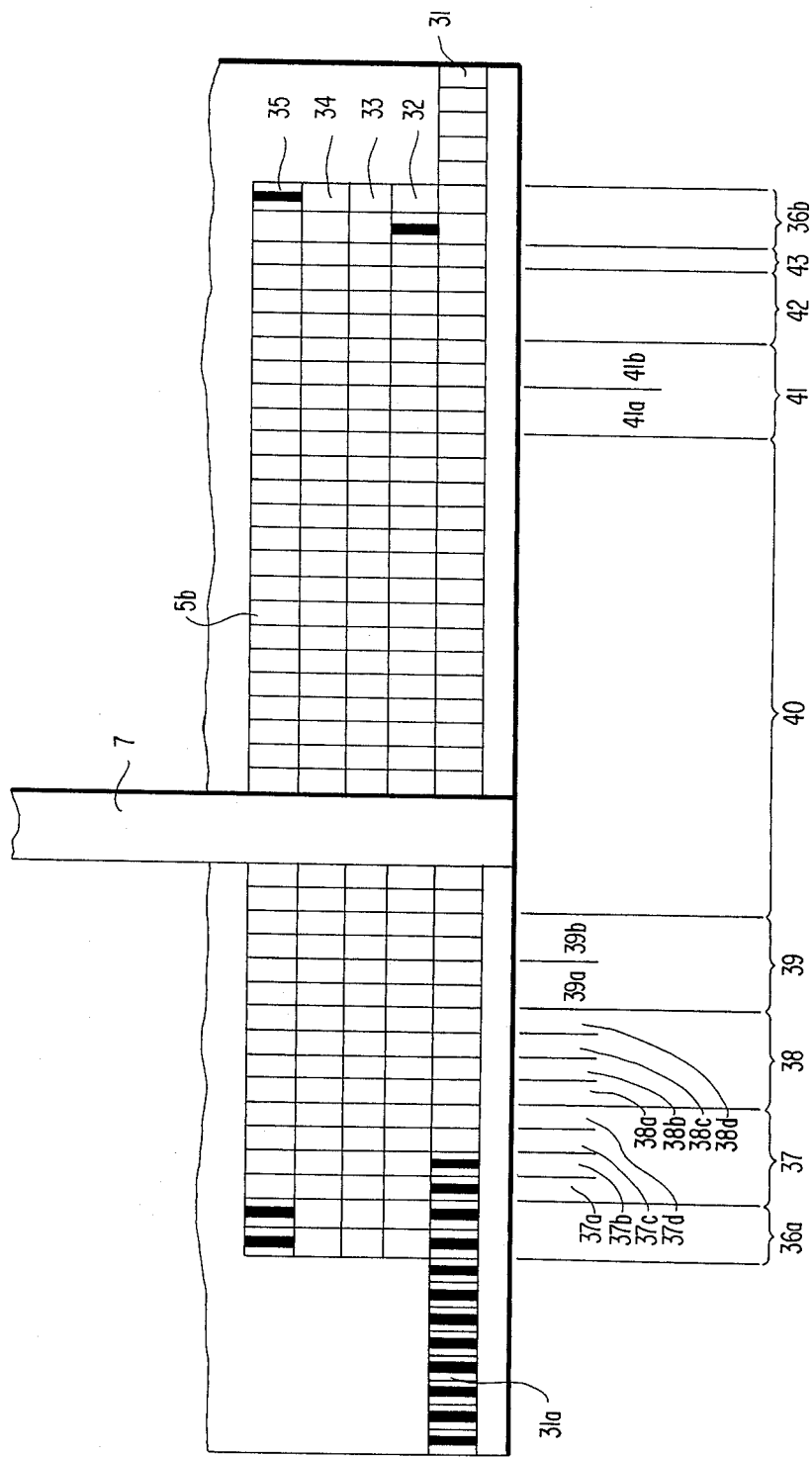
FIG. 3 is a diagram for explaining the formation of the optical marks on a lower part of the commutation ticket prepared by the system shown in FIG. 1.

The vertical arrangement of positions (hereinafter termed columns) of the information format are further allocated as shown in FIG. 3. The columns 36a and 36b are used for discriminating the feeding direction of the ticket relative to the mark reader. By thus discriminating the feeding direction of the ticket, the data on the ticket can be read out correctly regardless of the direction in which the ticket is inserted into the automatic examining device. Columns 37 are used for indicating the starting date of the period of validity, and columns 38 are used for indicating the ending date of the same. Within these columns, each of the columns 37a and 38a corresponds to the lowest digit of the year indicated in the pure binary four bits code. Likewise, each of the columns 37*b* and 38*b* corresponds to the month indication code wherein the twelve months are indicated in the pure binary four bits code. The tens digit and the units dight of the dates are represented by the columns 37*c*, 38*c*, and 37*d*, 38*d*, respectively, both in the pure binary four bits code.

Columns 39, 40, 41, 42, and 43 are used for including data pertaining to the starting station, route designation, destination station, a spare column, and the kind of the commutation ticket, respectively.

For recording the above described bit coded information on the photosensitive card, the bit pattern corresponding thereto is formed on the display-panel 5 by activating about 200 light emitting elements 5*b* selectively as described hereinbefore. Alternatively, five light emitting elements may be arranged in a row perpendicular to the feeding direction of the photosensitive card at a position between the exposing device 13 and the developing device 14, and the light emitting elements can be activated selectively under the control of the minicomputer 1 in accordance with the information to be contained in each of the columns while the photosensitive card is shifted through these devices.

Still another method can be considered wherein the optical marks imprinted on the rear side 6*b* of the request card 6 are photographically transcribed onto the lower part of the commutation card. However, such a method is found to be rather troublesome because dirt and spots on the surface 6*b* are also photographically transcribed on the lower part of the photosensitive card, and furthermore, information which must be changed must be previously eliminated from the optical marks and supplied, for instance, from other optical system.

Figure 4:
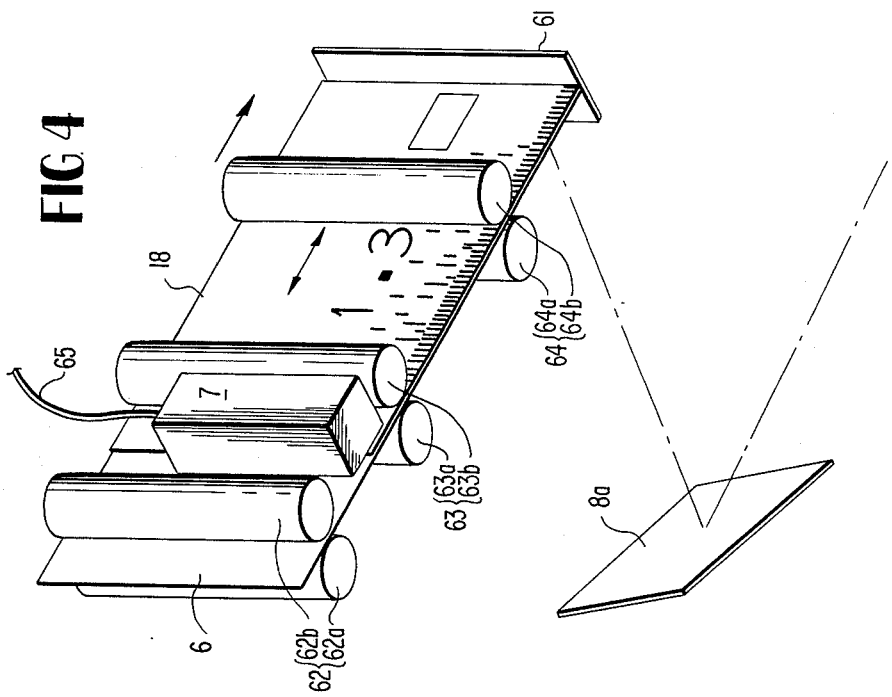
FIG. 4 is a perspective view of a device for reading the optical marks on the commutation ticket.

A method for preparing a new commutation ticket utilizing an old commutation ticket will now be described in detail with reference to FIG. 4. A commuter who wants a new commutation ticket of a continuing nature prepares a request card and hands it to a person in the booking office together with the old commutation ticket. The person then examines the request card and the ticket to confirm the requisition of a continued commutation ticket, and inserts the request card and the old commutation ticket combined in a back to back relation into a port provided on the front panel. The card and the commutation ticket thus combined are then sent through pairs of rollers 62, 63, and 64 in the direction marked by the arrow. Within the pairs of rollers, 62*a*, 63*a*, and 64*a* are driving rollers, and 62*b*, 63*b*, and 64*b* are tension rollers. Between the two pairs of rollers 62 and 63, an optical mark reader 7 including a plurality of photoelectric elements is provided.

The plurality of photoelectric elements are arranged in the mark reader 7 in a row perpendicular to the extending direction of the above-described tracks of optical marks in such a manner that each of the photoelectric elements is aligned with one of the tracks. When the commutation ticket is shifted laterally through the mark reader 7, the plurality of photoelectric elements read out the information included in each column of the optical marks successively, and deliver electric signals corresponding to those in the column to the minicomputer 1. The shifting of the commutation ticket 18 is terminated when it abuts a stopper 61. In other words, the stopper 61 cooperates with a limit switch which opens the electric circuits leading to the driving rollers 62*a*, 63*a*, and 64*a*.

When the commutation ticket 18 combined with the request card 6 in a back to back relationship is stopped as described above, the name, age, and sex of the commuter described on the request card are transcribed optically as described hereinbefore. When a signal indicating the termination of the exposure is issued, all the driving rollers 62*a*, 63*a*, and 64*a* are driven in the reverse directions, and the combination of the card and the ticket 18 are delivered from the card inserting port on the front panel.

As will be apparent from the above description, the new commutation ticket can be prepared using the old commutation ticket and the request card without requiring the use of a keyboard or transcription of the data onto a mark card, so that the period required for preparing a commutation tickey can be substantially shortened and the labor required for the same can be remarkably reduced.

For the automatic examination of the commutation ticket, a commuter will simply insert the commutation ticket into an inlet port of an automatic examination device. The device includes a mark reader and ticket feeding rollers similar to those indicated in FIG. 4 so that the data included in the form of the optical mark pattern in the lower part of the ticket are read out by the mark reader as described above. If coincidence is obtained as to the period of validity, starting station, destination station, etc., the commutation ticket is sent through the device using a well known conveyor to an outlet port provided at a position along the passage of the commuter. The commuter then simply picks up the commutation ticket from the outlet port and passes through the examination gate. However, if coincidence is not obtained for any of the data, a buzzer may sound or the gate may be closed thereby to block the commuter from passing through the gate.

Heretofore, various trials have been carried out for the automatic examination of the commutation ticket. However, most of the commutation tickets have been provided with a number of punched holes as in the case of the punched tapes used for a computer for the optical examination of the commutation ticket. Since numerous holes ae employed and the size of the holes are excessively large, reading of the commutation ticket visually is thereby hampered, and none of the trials have yet been successful. The commutation ticket preparing device according to the present invention can provide a commutation ticket bearing all the required information in letters and figures as in an ordinary commutation ticket and also in an optical mark pattern, whereby a reduction in labor and shortening in the period required for the preparation of the commutation ticket can be attained, and the automatic examination thereof is also made possible.

While the invention has been described in detail and with reference to specific embodiments thereof, it will be apparent to one skilled in the art that various changes and modifications can be made therein without departing from the spirit and scope thereof.

What is claimed is:

1. A system for preparing commutation tickets and the like comprising means for generating indicia required for providing a commutation ticket and the like, means for optically recording the indicia on a photosensitive material, means for optically recording data required for the preparation of the commutation ticket on the photosensitive material as machine readable digital marks, means for reading the digital marks recorded on an issued commutation ticket and the like for utilizing the optically recorded data therein in the preparation of a new ticket, means for transcribing the name and age of a commuter from a commuter ticket request card, means for feeding said photosensitive material through an exposing device, a developing device, and an image stabilizing device, and a keyboard for introducing all the data required for preparing a commutation ticket and the like into a minicomputer, wherein said means for generating indicia comprises an ultramicrofiche and a display panel controlled by said minicomputer.

2. The system as set forth in claim 1, wherein said means for optically recording the data required for the preparation of the commutation ticket on the photosensitive material as digital marks comprises about 200 light emitting elements provided in a part of said display panel, and activatable selectively under the control of said minicomputer, and an optical system for projecting the image of the light emitting elements onto the required part of the photosensitive material.

3. The system as set forth in claim 1, wherein said means for optically recording the data required for the preparation of the commutation ticket on the photosensitive material as digital marks comprises a plurality of light emitting elements provided between said exposing device and said developing device.

4. The system as set forth in claim 2, wherein said digital marks are recorded on a part of said photosensitive material under control of said minicomputer when a start key on said key board is depressed with reference to the data described on said request card.

* * * * *